United States Patent
Arnold et al.

(10) Patent No.: US 7,611,566 B2
(45) Date of Patent: Nov. 3, 2009

(54) DIRECT GAS RECIRCULATION HEATER FOR OPTIMAL DESORPTION OF GASES IN CRYOGENIC GAS STORAGE CONTAINERS

(75) Inventors: Gerd Arnold, Nauheim (DE); Ulrich Eberle, Mainz (DE); Dieter Hasenauer, Weinheim (DE)

(73) Assignee: GM Global Technology Operations, Inc., Detroit, MI (US)

( * ) Notice: Subject to any disclaimer, the term of this patent is extended or adjusted under 35 U.S.C. 154(b) by 420 days.

(21) Appl. No.: 11/434,384

(22) Filed: May 15, 2006

(65) Prior Publication Data

US 2007/0261552 A1 Nov. 15, 2007

(51) Int. Cl.
*F17C 11/00* (2006.01)
*B01D 53/14* (2006.01)

(52) U.S. Cl. .................. 95/114; 96/146; 206/0.7; 62/46.1

(58) Field of Classification Search ............ 95/114, 95/115, 146; 96/146; 420/900; 429/20, 429/26; 62/607, 46.1, 46.3, 48.1; 141/82
See application file for complete search history.

(56) References Cited

U.S. PATENT DOCUMENTS

| | | | |
|---|---|---|---|
| 4,343,770 A * | 8/1982 | Simons | 422/112 |
| 4,444,727 A * | 4/1984 | Yanagihara et al. | 422/223 |
| 4,716,736 A * | 1/1988 | Schwarz | 62/46.2 |
| 5,202,195 A * | 4/1993 | Stedman et al. | 429/17 |
| 6,444,016 B2 * | 9/2002 | Oshima et al. | 96/111 |
| 6,860,923 B2 * | 3/2005 | Myasnikov et al. | 96/146 |
| 6,861,168 B2 * | 3/2005 | Shimada et al. | 429/20 |
| 2004/0011444 A1 * | 1/2004 | Okada et al. | 148/712 |
| 2005/0287407 A1 * | 12/2005 | Bushko | 429/26 |
| 2007/0180998 A1 | 8/2007 | Arnold et al. | |
| 2008/0020250 A1 * | 1/2008 | Schuetz et al. | 429/26 |

FOREIGN PATENT DOCUMENTS

| | | |
|---|---|---|
| DE | 103 21 213 A1 | 12/2003 |
| DE | 10 2004 043 079 A1 | 3/2006 |
| JP | 60-113898 A * | 6/1985 |
| JP | 63-140200 A * | 6/1988 |
| WO | 2005/044454 A2 | 5/2005 |

OTHER PUBLICATIONS

"Systematic design of Pore Size and Functionality in Isoreticular MOFs and Their Application in Methane Storage", M. Eddaoudi, J. Kim, N. Rosi, D. Vodak, J. Wachter, M. O'Keeffe, O. Yaghi, Science, V. 295, 469-472, Jan. 18, 2002.

(Continued)

*Primary Examiner*—Frank M Lawrence

(57) ABSTRACT

A cryogenic gas storage system for optimal desorption of adsorbed gases, wherein a gas storage material is subjected to enhanced, ample selected recirculation of gas of the same type as the adsorbed gas, at suitable temperature and pressure, so as to supply of heat energy to the material and thereby provide optimal desorption of the gas. Output gas is heated by ambient heat or dissipation heat utilizing at least one heat exchanger. A portion of the output gas goes to a gas consumer, the remainder is fed back to the container.

14 Claims, 4 Drawing Sheets

OTHER PUBLICATIONS

"Hydrogen Storage in Microporous Metal-Organic Frameworks", N. Rosi, J. Eckert, M. Eddaoudi, D. Vodak, J. Kim, M. O'Keeffe, O. Yaghi, Science, V. 300, 1127-1129, May 16, 2003.

"A Route to High Surface Area, Porosity and Inclusion of Large Molecules in Crystals", H. Chae, D. Siberio-Perez, J. Kim, Y.B. Go, M. Eddaouddi, A. Matzger, M. O'Keeffe, O. Yaghi, Nature, V. 427, 523-527, Feb. 5, 2004.

"Microporous Polymeric Materials", P. Budd. S. Makhseed, B. Ghanem, K. Msayib, C. Tattershall, N. McKeown, Materials Today, 40-46, Apr. 2004.

"New Materials for the Separation and Storage of Hydrogen", B. Bockrath, C. Matranga, J. Culp, E. Bittner, M. Smith, B. Meyers, National Energy Technology Laboratory, U.S. Dept. of Energy, 39 pages, Aug. 1, 2005.

"News Release: Nanocubes as Hydrogen Storage Units: The "Battery of Tomorrow" for Laptops and Cell Phones" 10 pages (with additional 10 page Powerpoint) P348e, BASF Aktiengesellschaft, Ludwigshafen, Germany, Oct. 28-29, 2002.

G. Ferey, et al "A Chomium Terephthalate-Based Solid with Unusually Large Pore Volumes and Surface Area"; Science, vol. 309, 2040-2042 (Sep. 23, 2005).

German Office Action German application 10 2007 022 204.3, dated May 13, 2009, counterpart to U.S. Appl. No. 11/434,384.

* cited by examiner

DIRECT GAS RECIRCULATION HEATER FOR OPTIMAL DESORPTION OF GASES IN CRYOGENIC GAS STORAGE CONTAINERS

TECHNICAL FIELD

The present invention relates to desorption of gases and, more particularly, to an apparatus for optimal desorption of gases in cryogenic gas storage containers utilizing highly porous gas storage materials.

BACKGROUND OF THE INVENTION

Newly developed highly porous gas storage materials suitable for cryogenic adsorption and desorption of gases are known in the Art. Such materials are, for example, activated charcoal, metal organic frameworks (MOFs and MILs), nano-cubes, coordination polymers (CPs), prussian blue analogues, or polymers of intrinsic microporosity. A description of highly porous gas storage materials can be found in the articles written by Professor Yaghi of the University of Michigan, published in Science magazine. (Systematic Design of Pore Size and Functionality of Isoreticular MOFs and Their Application in Methane Storage, Science Vol. 295, 18 January 2002; Hydrogen Storage in Microporous Metal-Organic Frameworks, Science Vol. 300, 16 May 2003). Also, in a press release by Dr. Ulrich Muller, of BASF, 28/29 10, 2002, "Nano-cubes for Hydrogen Storage" MOFs are described here as "Nano-cubes". Highly porous polymers suitable as gas storage materials are also described in an article in Materials Today, April 2004, "Microporous Polymeric Materials". All these highly porous gas storage materials have surface area densities from 3,000 $m^2/g$ (activated charcoal, MOF5) to more than 4,500 $m^2/g$ (MOF177, NATURE, Vol. 427, 5 February 2004, "A Route to High Surface Area Porosity and Inclusion of Large Molecules in Crystals"). Recently developed MOFs (MILs), such as nano-cubes, have shown surface area densities greater than 5,000 $m^2/g$, ie., MEL 101 with 5,600 $m^2/g$ (MIL-101 is a new, unusually porous material whose unit cell has an unprecedented volume of about 702,000 cubic Angstroms, meaning that the solid is about 90% empty space once the solvent molecules normally filling its pores are removed. It also boasts pores that are 29 or 34 Angstroms across and an internal surface area of 5,900 $m^2/g$ (Science 2005, 309, 2040).

Due to their high porosity (typical mass densities ranging from 0.3 to 0.6 $g/cm^3$) and high surface area, highly porous gas storage materials could be used for the storage of gases, such as methane and hydrogen. The gas is adsorbed (using very weak van der Waals forces) on the large surface areas as a monolayer (for moist cases). These highly porous gas storage materials are usually fine powders. To increase the volumetric density, they could be compressed to be formed into fine or course granulated material (pellets). This granulated material has a higher mass density, eg., about 0.7 $g/cm^3$, but also an up to 30% reduction in the surface area. These highly porous gas storage materials may be filled into a pressure vessel. The heat generated during the adsorption process (adsorption energy between about 3 and 6 kJ/mol $H_2$ with MOFs and about 6 kJ/mol $H_2$ with activated charcoal) should be compensated by a heat exchanger. There may be ambient temperature and cryogenic operation modes depending on the gas, for example $H_2$ or natural gas.

Cryogenic gas storage containers have become especially interesting to the automotive industry through the development of these aforementioned highly porous gas storage materials. The cryogenic storage of gaseous energy carriers, such as natural gas (methane) and hydrogen is especially interesting for automotive applications utilizing, for example, fuel cells or internal combustion engines since a high degree of development potential is available regarding tank volumes (required space), weight, and safety in conjunction with these aforementioned highly porous gas storage materials.

The stored gas is removed from the cryogenic gas storage containers by desorption. Desorption occurs by a suitable supply of heat energy and by a reduction, usually, of the gas pressure.

Previously, cryogenic gas storage containers were only built for purposes of research or material development whereby desorption of the stored gas is realized through the use of direct, internal electric heaters with heating wires imbedded in the gas storage media or heat exchangers with embedded heat exchanger tubes in the gas storage media.

An energy saving desorption strategy is not possible or possible only within limits through the introduction of heat for desorption using an electric heater since electrical energy for the electric heater must be supplied, with a loss of efficiency. Also, a space saving desorption strategy is possible only within limits utilizing embedded heat exchangers since a large number of heat exchanger tubes must be placed in the cryogenic gas storage container in order to transfer the necessary quantity of heat. This unacceptably increases the volume of the cryogenic gas storage container and only an incomplete uniform temperature distribution is achieved, with high costs.

Furthermore, an introduction of the entire heat requirement for desorption by an electric heater or by heat exchanger tubes is hampered in that direct heat contact with the highly porous gas storage material is inhibited through marginal heat contact of the electric heater or heat exchanger tubes with the surrounding gas storage media. Thus, a high temperature profile is necessary for the required desorption heat flux whereby significantly higher heat energy must be introduced into the cryogenic gas storage container than would be necessary for the pure desorption of the gases.

Cryogenic gas storage containers are also developed as testing devices, in which the gas storage material is enveloped by a sheathing made of liquid nitrogen. With desorption, the corresponding heat quantity is removed from the liquid nitrogen, to prevent too low a cooling of the gas storage material thereby maintaining the gas stream during desorption by pressure relief. Thus, today there is no existing optimum heating or space saving strategy for desorption of stored gas from cryogenic gas storage containers.

Even, for example, for automotive applications utilizing, for example, fuel cells, an optimal energy and space saving strategy for desorption of stored gas from cryogenic gas storage containers is not known, whereby the ambient heat and/or heat dissipation of an internal combustion engine and/or a fuel cell is utilized. The heat dissipation of an internal combustion engine or a fuel cell cannot be directly introduced in heat exchanger tubes within the cryogenic gas storage container since, for example, the heat transfer medium, coolant or water, would freeze. Even ambient air cannot be introduced directly into the heat exchanger tubes since, for example for cryogenic storage at 80 K, a separation and liquefaction of the nitrogen and oxygen gases would occur.

Accordingly, what is needed in the art is an optimal energy, weight, and space saving strategy for desorption of stored gas from cryogenic gas storage containers whereby, for example for automotive applications utilizing fuel cells, the ambient heat and/or heat dissipation of an internal combustion engine and/or a fuel cell is utilized.

SUMMARY OF THE INVENTION

The present invention is a cryogenic gas storage system for optimal desorption of adsorbed gases, preferably hydrogen or natural gas, within a cryogenic gas storage container utilizing highly porous gas storage materials, in powder or granular form (pellets), wherein the highly porous gas storage material is, preferably, arranged in such a manner as to enhance ample flow of gases, at suitable temperatures and pressures, during adsorption and desorption processes and also allows for ample supply of heat energy during the desorption process, thereby providing optimal desorption of gases. The temperature of the cryogenic gas storage container is, preferably, approximately 80 K. Gas storage utilizing highly porous gas storage materials, in powder or granular form (pellets), within a cryogenic gas storage container can generally be done with significantly lower pressures (e.g., 10 bar to 50 bar) than with, exclusively, gas pressure storage (e.g., 200 bar to 700 bar). Furthermore, temperatures (e.g., 80K to 200K) of output gases from the cryogenic gas storage container utilizing highly porous gas storage materials, in powder or granular form (pellets), may be higher than temperatures of output gases from storage containers of gases, for example, hydrogen or natural gas, in liquid form.

The present invention consists of a cryogenic gas storage container utilizing, for example, a vacuum super insulation, containing gas stored in highly porous gas storage materials, in powder or granular form (pellets), within the interior, and a gas return circuit from the output of the cryogenic gas storage container to the input of the cryogenic gas storage container. An auxiliary, for example electric, heater may also be employed as a booster heater, if necessary, in the gas feed back path or gas return circuit. To flow into the input of the cryogenic gas storage container, the pressure of the return gas is also increased above the pressure of the gas within the cryogenic gas storage container. In one realization of the invention the storage container comprises one of the modules (with a large diameter) described in U.S. Patent Application Publication 2007/0180998, published Aug. 9, 2007, the disclosure of which is hereby herein incorporated by reference. In another realization of the invention the container comprises several, smaller of those modules using an optimized stacking scheme for the modules. The input gas is delivered as described in the inner pipes of said U.S. Patent Application Publication 2007/0180998, and the output gas is removed from the void spaces in between the modules respectively between the modules and the pressure vessel. But, the invention described herein is not limited to these specific designs.

Herein the gas present in the return circuit is referred to as the "return gas". Initially, the gas return circuit contains heated free gas (i.e., non-adsorbed gas) wherein the free gas is the same type of gas as the adsorbed gas and the cryogenic gas storage container contains free gas and adsorbed gas. The return gas is heated by ambient heat or dissipation heat (i.e., heat dissipation from an internal combustion engine or fuel cell) to provide the desorption heat for the adsorbed gas utilizing at least one heat exchanger, preferably, at the output of the cryogenic gas storage container. An auxiliary, for example an electric or catalytic, heater may also be employed as a booster heater, if necessary, in the gas return circuit. To flow into the input of the cryogenic gas storage container, the pressure of the return gas is also increased above the pressure of the gas within the cryogenic gas storage container. The heated, pressurized return gas enters the input of the cryogenic gas storage container, wherein gas desorption occurs by heat convection. The now cooled free gas and desorbed gas exit the cryogenic gas storage container at the output of the cryogenic gas storage container as an output gas. The output gas is heated by ambient heat or dissipation heat (i.e., heat dissipation from an internal combustion engine or fuel cell) utilizing at least one heat exchanger. The output gas is resolved into first and second gases. The first gas is fed back or returned to the gas feed back path or gas return circuit toward the input of the cryogenic gas storage container and now becomes the return gas, whereby the above process repeats. The second gas flows toward a consumer. A consumer may be, for example, an automotive application utilizing fuel cells and/or an internal combustion engine.

The ambient heat or dissipation heat (i.e., heat dissipation from an internal combustion engine or fuel cell) utilizing at least one heat exchanger to heat the return gas is used directly for desorption or for compensation of the desorption energy if an undesirable cooling of the cryogenic gas storage container occurs due to withdrawal of gas or by desorption with decreasing pressure. Compensation ensures that the operating temperature of the cryogenic gas storage container is maintained so that sufficient output gas is supplied to the consumer. An auxiliary, for example an electric or catalytic, heater in the gas return circuit may be employed as a booster heater allowing for further heating of the return gas up to 600 K, whereby the return gas can flow very quickly into the cryogenic gas storage container to rapidly increase (accelerate) desorption of the stored gas in order to react to a sudden gas increase required by the consumer without a large decrease in consumer gas pressure. Also, the use of an optional preheater in the interior of the cryogenic gas storage container facilitates desorption of the stored gas and allows for the use of a smaller amount of return gas as well as a smaller gas pump.

These strategies lead to optimized energy, weight, and space saving. Even with an optional booster heater or electrical energy used for valves and a gas pump, the energy balance is advantageous and optimal. The use of an optional preheater may facilitate desorption within the cryogenic gas storage container and allow the use of a smaller amount of return gas as well as a smaller gas pump.

BRIEF DESCRIPTION OF THE DRAWING

The description herein makes reference to the accompanying drawings wherein like reference numerals refer to like parts throughout the several views.

DESCRIPTION OF THE PREFERRED EMBODIMENT

Figure 1:
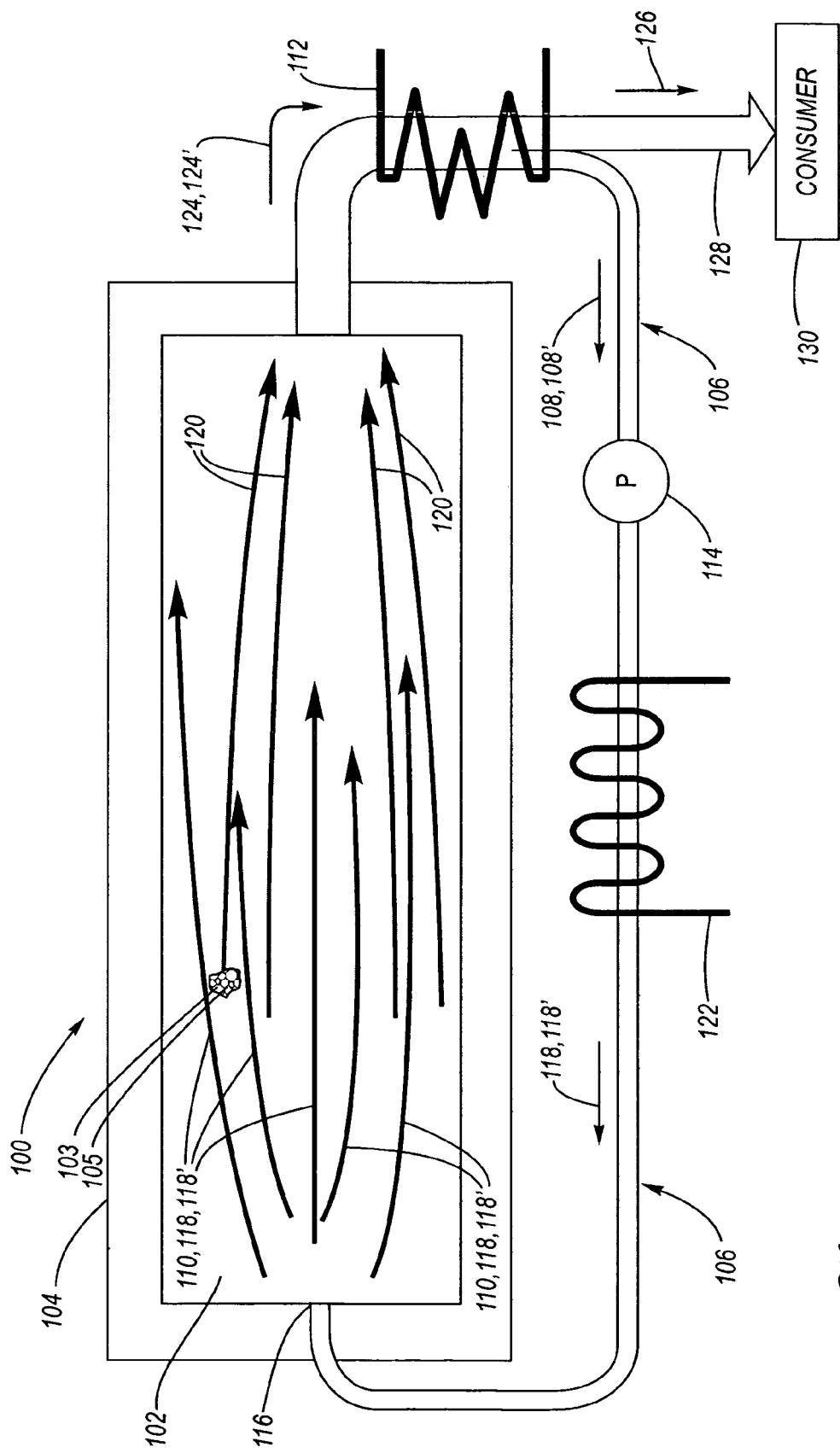
FIG. 1 is an example of a first preferred embodiment according to the present invention.

FIG. 1 is an example of a first preferred embodiment 100 according to the present invention. FIG. 1 utilizes highly porous gas storage material 103, in powder or granular form (pellets), storing adsorbed gas 105 in the interior 102 of a cryogenic gas storage container 104 having a gas feed back path or gas return circuit 106. Initially, the gas return circuit 106 contains heated free gas (i.e., non-adsorbed gas) 108', wherein the free gas is the same type of gas as the adsorbed gas 105 (i.e., both are the same gas as, for example, hydrogen) and the interior 102 of the cryogenic gas storage container 104 contains free gas 110 and the adsorbed gas. The free gas 108' is heated by ambient heat or dissipation heat (i.e., heat dissipation from an internal combustion engine or fuel cell) to provide desorption heat for the adsorbed gas 105 utilizing heat exchanger 112. The pressure of the free gas 108' is increased by a gas pump 114 (i.e., hydrogen pump) and is optionally heated by an auxiliary, for example an electric or catalytic, heater 122, if necessary, and, subsequently, enters the input 116 of the cryogenic gas storage container 104 as heated, pressurized gas 118', whereby free gas 110 in the interior 102 of the cryogenic gas storage container 104 is also heated. Heated free gas 110 or 118' desorb gas 120 from the adsorbed gas 105 stored in the highly porous gas storage material 103 by heat convection, thereby cooling free gas 110, 118'. The now cooled free gas 110, 118' and desorbed gas 120 exit the interior 102 of the cryogenic gas storage container 104 as output gas 124'. The output gas 124' is heated by ambient heat or dissipation heat (i.e., heat dissipation from an internal combustion engine or fuel cell) utilizing heat exchanger 112 and is, subsequently, resolved into first heated gas 108 and second heated gas 126. The first heated gas 108 is returned to the gas return circuit 106, whereas the second heated gas 126, in pipe 128, flows toward a consumer 130. The consumer 130 may be, for example, an automotive application utilizing fuel cells and/or an internal combustion engine.

The pressure of the first heated gas 108 is increased by energizing gas pump 114 and enters the input 116 of the cryogenic gas storage container 104 as heated, pressurized gas 118. Heated, pressurized gas 118 desorbs gas 120 from the adsorbed gas 105 stored in the highly porous gas storage material 103 by heat convection, thereby cooling gas 118. The now cooled gas 118 and desorbed gas 120 exit the interior 102 of the cryogenic gas storage container 104 as an output gas 124. The output gas 124 is heated by ambient heat or dissipation heat (i.e., heat dissipation from an internal combustion engine or fuel cell) utilizing the heat exchanger 112 and is, subsequently, resolved into the first and second heated gases 108, 126, whereby the above mentioned process repeats.

The auxiliary, for example an electric or catalytic, heater 122 may be employed as a booster heater, if necessary, for quick auxiliary heating of the pressurized gas 118, 118' to provide faster desorption in the interior 102 of the cryogenic gas storage container 104 to react to a sudden increase in the amount of gas 126 required by the consumer 130 without causing a large decrease in gas pressure.

Figure 2:
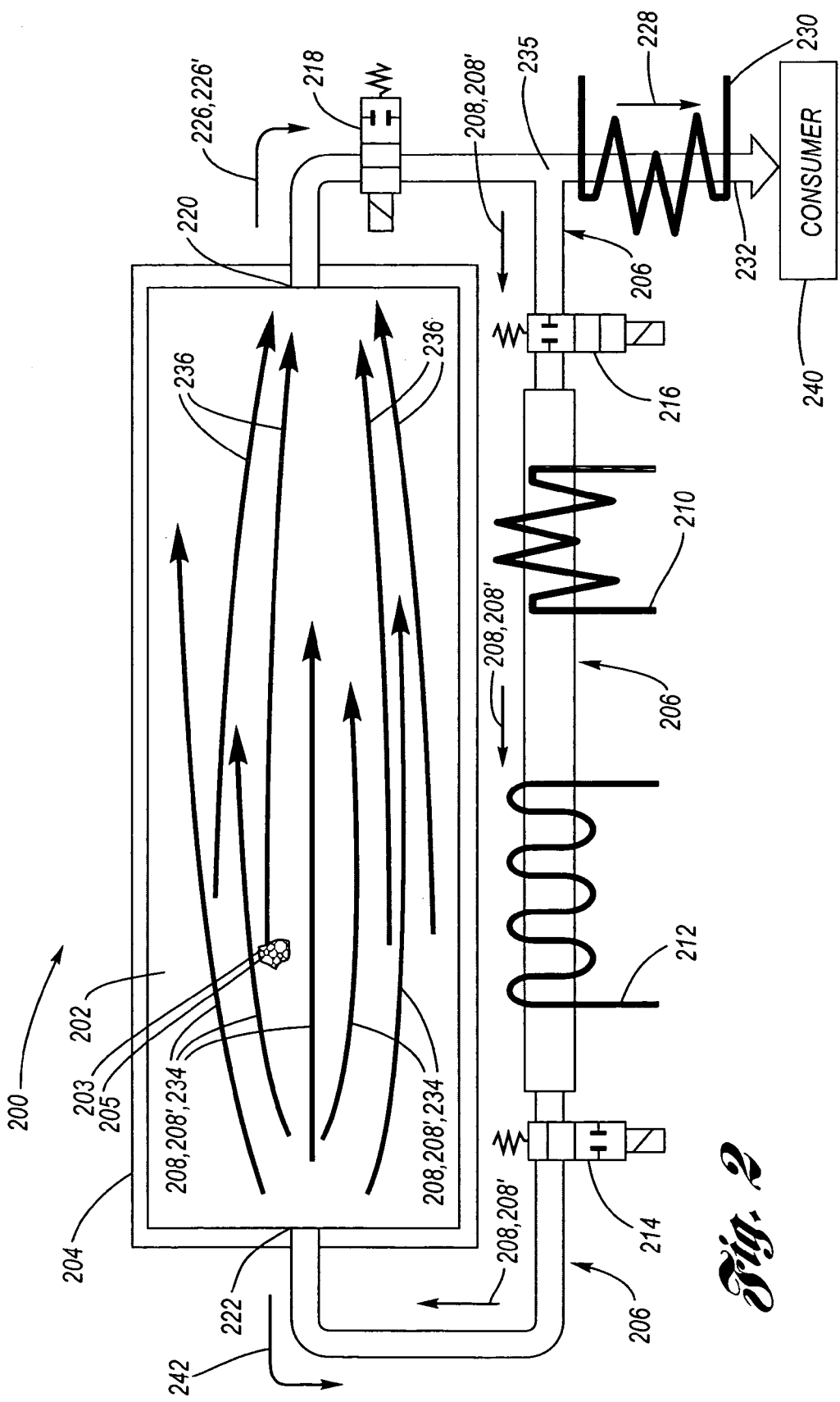
FIG. 2 is an example of a second preferred embodiment according to the present invention.

FIG. 2 is an example of a second preferred embodiment 200 according to the present invention. FIG. 2 utilizes highly porous gas storage material 203, in powder or granular form (pellets), storing adsorbed gas 205 in the interior 202 of a cryogenic gas storage container 204 having a gas feed back path or gas return circuit 206. Initially, the gas return circuit 206 contains free gas (i.e., non-adsorbed gas) 208' wherein the free gas is the same type of gas as the adsorbed gas 205 (i.e., both are the same gas as, for example, hydrogen) and the interior 202 of the cryogenic gas storage container 204 contains free gas 234 and the adsorbed gas. The free gas 208', a first heat exchanger 210, and, an optional, auxiliary, for example an electric or catalytic, heater 212, employed as a booster heater, are located between first and second gas valves 214, 216 and collectively provide a volume in the gas return circuit 206 predetermined by desorption requirements and/or the quantity of highly porous gas storage material 203 in the interior 202 of the cryogenic gas storage container 204. A third gas valve 218 is located at the output 220 of the cryogenic gas storage container 204.

With the first and second gas valves 214, 216 closed, the free gas 208' is heated by ambient heat or dissipation heat (i.e., heat dissipation from an internal combustion engine or fuel cell) utilizing the first heat exchanger 210 to provide desorption heat for the adsorbed gas 205 and to increase the pressure of the free gas 208' above the pressure of the free gas 234 in the interior 202 of the cryogenic gas storage container 204 in order that the free gas be able to flow into the input 222 of the cryogenic gas storage container.

Subsequently, opening the first gas valve 214 causes the heated, pressurized free gas 208' to enter the input 222 of the cryogenic gas storage container 204, whereby free gas 234 in the interior 202 of the cryogenic gas storage container 204 is also heated. Heated free gases 208', 234 desorb gas 236 from the adsorbed gas 205 stored in the highly porous gas storage material 203 by heat convection, thereby cooling free gas 208', 234 at which time the first gas valve 214 is closed, the second gas valve 216 is opened, and the third gas valve 218 is opened. The now cooled free gases 208', 234 and desorbed gas 236 exit the interior 202 of the cryogenic gas storage container 204 at the output 220 of the cryogenic gas storage container as an output gas 226'. The output gas 226' passes through the open third gas valve 218 and is resolved into a first gas 208 and a second gas 228. The first gas 208 is returned to the gas return circuit 206 and passes through the open second gas valve 216 toward the input 222 of the cryogenic gas storage container 204. The second gas 228 is heated by ambient heat or dissipation heat (i.e., heat dissipation from an internal combustion engine or fuel cell) utilizing a second heat exchanger 230 in pipe 232 and flows toward a consumer 240. The consumer 240 may be, for example, an automotive application utilizing fuel cells and/or an internal combustion engine.

Now closing the second gas valve 216, with the first gas valve 214 closed, the first gas 208 is heated by ambient heat or dissipation heat (i.e., heat dissipation from an internal combustion engine or fuel cell) utilizing the first heat exchanger 210 to provide desorption heat for the adsorbed gas 205 and to increase the pressure of the first gas above the pressure of the free gas 234 and desorbed gas 226 in the interior 202 of the cryogenic gas storage container 204 in order that the first gas be able to flow into the input 222 of the cryogenic gas storage container.

Subsequently, the heated, pressurized first gas 208 enters the input 222 of the cryogenic gas storage container 204 when the first gas valve 214 is opened. Heated, pressurized first gas 208 desorbs gas 236 from the adsorbed gas 205 stored in the highly porous gas storage material 203 by heat convection, thereby cooling the first gas 208 at which time the first gas valve 214 is closed, the second gas valve 216 is opened, and the third gas valve 218 is opened. The now cooled first gas 208 and desorbed gas 236 exit the interior 202 of the cryogenic gas storage container 204 at the output 220 of the cryogenic gas storage container as an output gas 226. The output gas 226 passes through the open third gas valve 218 and is resolved into a first gas 208 and a second gas 228. The first gas 208 is returned to the gas return circuit 206 and passes through the open second gas valve 216 toward the input 222 of the cryogenic gas storage container 204, whereby the above mentioned process repeats. The second gas 228 is heated by ambient heat or dissipation heat (i.e., heat dissipation from an internal combustion engine or fuel cell) utilizing the second heat exchanger 230 in pipe 232 and flows toward the consumer 240. The consumer 240 may be, for example, an automotive application utilizing fuel cells and/or an internal combustion engine.

The auxiliary, for example an electric or catalytic, heater 212 may be employed as a booster heater, if necessary, for quick auxiliary heating of the free gas 208' and first gas 208 to provide faster desorption in the interior 202 of the cryogenic gas storage container 204 to react to a sudden increase in the amount of gas 228 required by the consumer 240 without causing a large decrease in gas pressure.

In some instances, it may be desirable to cool or regenerate the gas return circuit 206. To cool or regenerate the gas return circuit 206, the cooled first gas 208 and desorbed gas 236 in the interior 202 of the cryogenic gas storage container 204 are made to flow in a reverse direction. If the third gas valve 218 at the output 220 of the cryogenic gas storage container 204 is closed, opening the first and second gas valves 214, 216 causes the cooled first gas 208 and desorbed gas 236 in the interior 202 of the cryogenic gas storage container to exit the cryogenic gas storage container as an output gas 242 in a reverse direction. That is, the cooled first gas 208 and desorbed gas 236 exit the interior 202 of the cryogenic gas storage container 204 as an output gas 242 passing through the input 222 of the cryogenic gas storage container 204 through the gas return circuit 206 toward the gas junction 235, thereby cooling the gas return circuit, whereupon it is diverted to the consumer 240 through pipe 232 due to the closed third gas valve 218. Consequently, by repeating the above described procedure, a cyclical or intermittent output gas 242 may be directed to the consumer 240.

Figure 3:
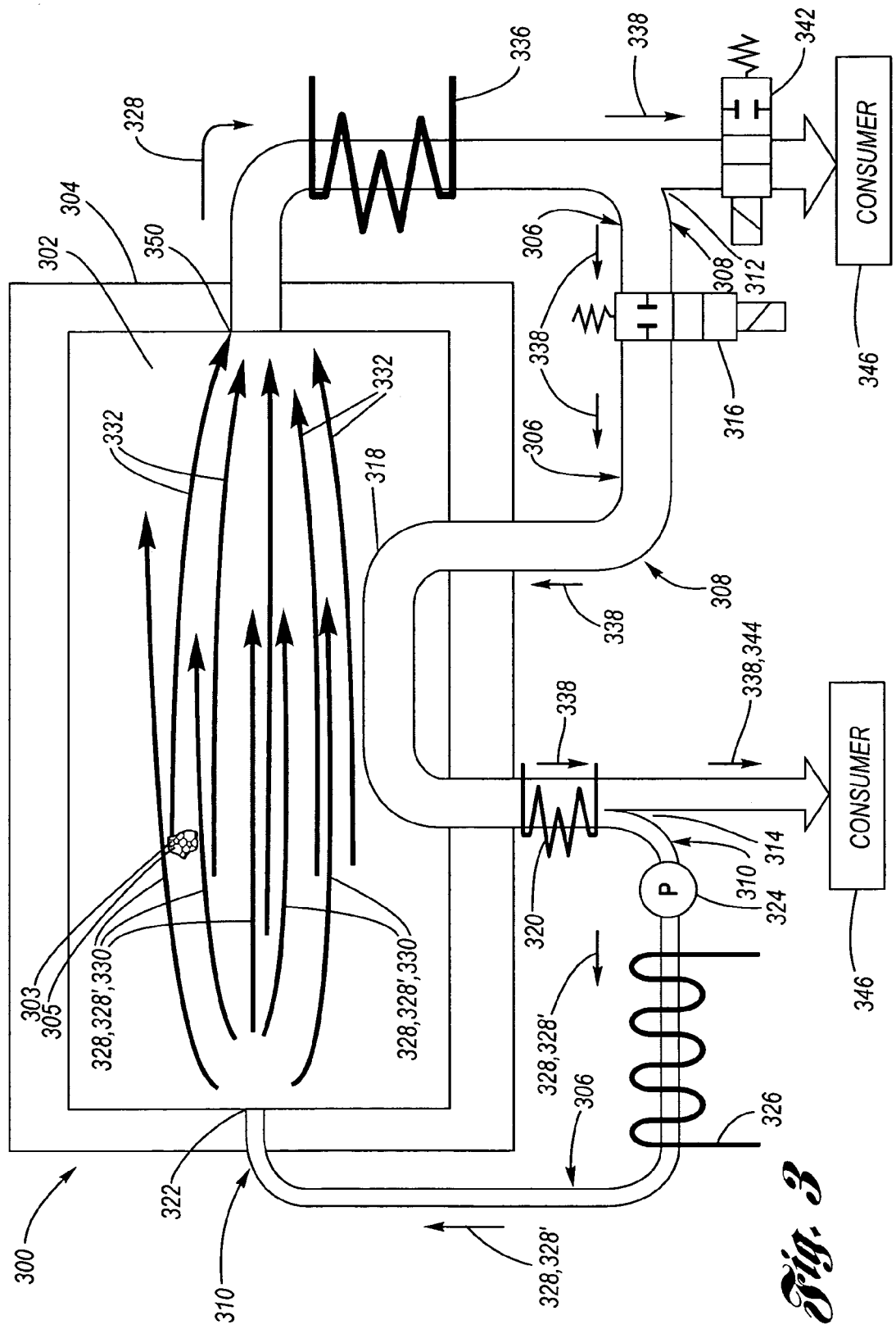
FIG. 3 is an example of a third preferred embodiment according to the present invention.

FIG. 3 is an example of a third preferred embodiment 300 according to the present invention. FIG. 3 utilizes highly porous gas storage material 303, in powder or granular form (pellets), storing adsorbed gas 305 in the interior 302 of a cryogenic gas storage container 304 having a gas return circuit 306. The gas return circuit 306 is comprised of first and second segments 308, 310.

The first segment 308 is located between a first gas junction 312 and a second gas junction 314. The first segment 308 consists of a first gas valve 316, a first heat exchanger 318, herein referred to as a "preheater", and a second heat exchanger 320.

The second segment 310 is located between the second gas junction 314 and the input 322 to the cryogenic gas storage container 304. The second segment 310 consists of a gas pump (i.e., hydrogen pump) 324 and, optionally, an auxiliary, for example an electric or catalytic, heater 326, employed as a booster heater.

Initially, the second segment 310 contains pressurized, heated free gas (i.e., non-adsorbed gas) 328' wherein the pressurized, heated free gas is the same type of gas (i.e., both are the same gas as, for example, hydrogen) as the adsorbed gas 305 and the interior 302 of the cryogenic gas storage container 304 contains free gas 330 and the adsorbed gas. The pressurized, heated free gas 328' is initially heated by ambient heat or dissipation heat (i.e., heat dissipation from an internal combustion engine or fuel cell) to provide desorption heat for the adsorbed gas 305 utilizing, for example, the second heat exchanger 320 and pressurized by energizing gas pump 324. An auxiliary, for example an electric or catalytic, heater 326 may also be employed as a booster heater, if necessary, in the second segment, as previously described.

The pressurized, heated free gas 328' enters the input 322 of the cryogenic gas storage container 304, whereby free gas 330 in the interior 302 of cryogenic gas storage container 304 is also heated. Heated free gases 328', 330 desorb gas 332 from the adsorbed gas 305 stored in the highly porous gas storage material 303 by heat convection, thereby cooling free gas 328', 330. The now cooled free gas 328', 330 and desorbed gas 332 exit the interior 302 of the cryogenic gas storage container 304 at its output 350 as output gas 338. The output gas 338 is heated by ambient heat or dissipation heat (i.e., heat dissipation from an internal combustion engine or fuel cell) utilizing a third heat exchanger 336.

The gas flow is regulated to assure a desired rate of gas desorption from the material 303. The heated output gas 338 is returned to the first segment 308 of the gas return circuit 306 if the first gas valve 316 is open and a second gas valve 342 is closed, whereby the necessary desorption temperature of the material 303 is provided by recirculation. Otherwise, if sufficient desorption temperature is present in the material 303, then the first gas valve 316 is closed and the second gas valve 342 is open, the heated output gas 338 flows through the second gas valve 342 toward a consumer 346. The consumer 346 may be, for example, an automotive application utilizing fuel cells and/or an internal combustion engine.

The heated output gas 338 in the first segment 308 passes through the preheater 318 and the second heat exchanger 320 to the second junction 314. If the gas pump 324 in the second segment 310 is energized, the heated output gas 338 in the first segment 306 is further resolved into a third gas 328 and a fourth gas 344 at the second junction 314. The third gas 328 is pressurized by energizing gas pump 324 in the second segment 310, whereupon the above mentioned process repeats. The fourth gas 344 at the second junction 314 flows toward the consumer 346.

If the gas pump 324 in the second segment 310 is not energized, the heated output gas 338 in the first segment 308 does not flow into the second segment 310 but flows toward the consumer 346 at the second junction 314.

Figure 4:
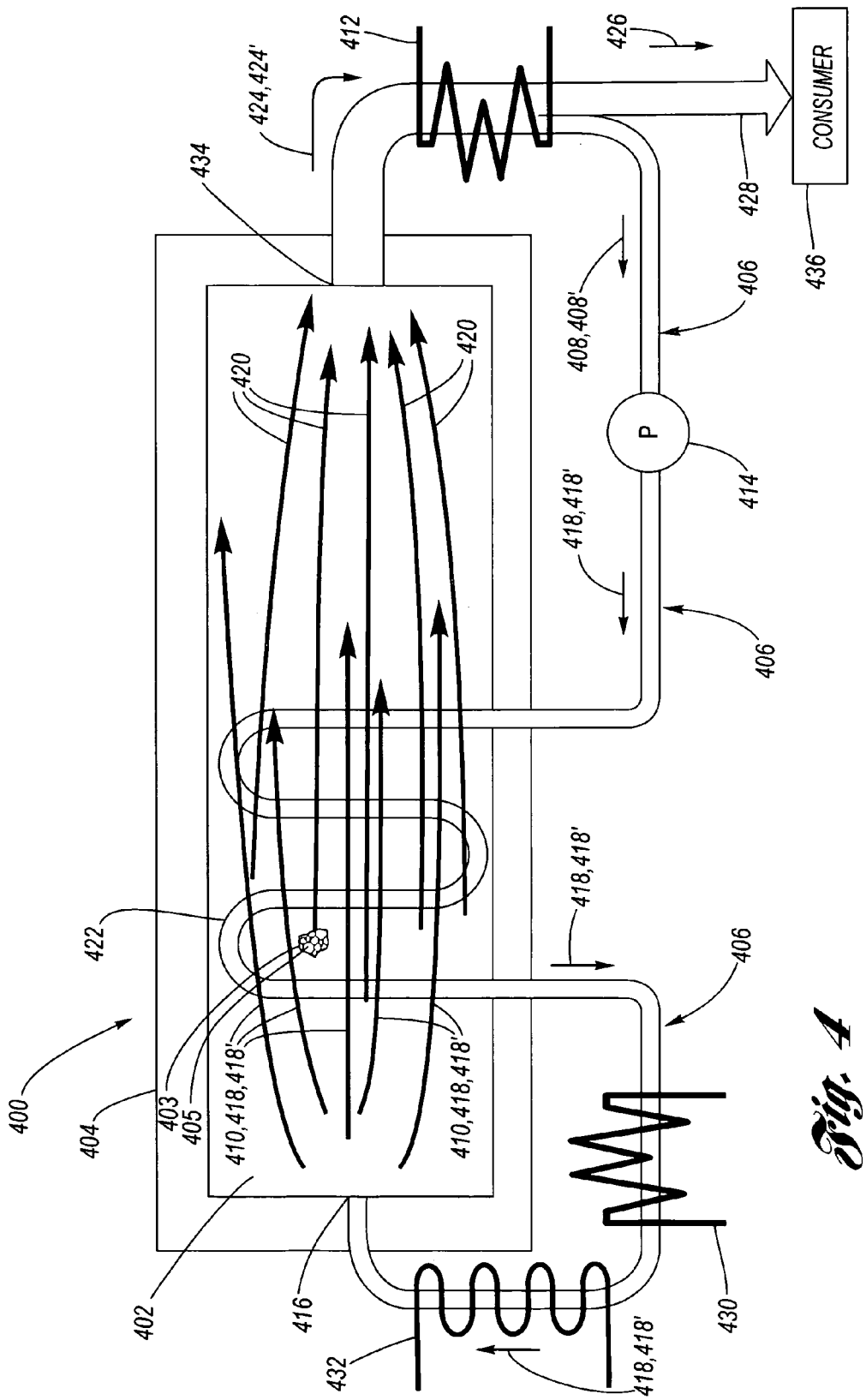
FIG. 4 is an example of a fourth preferred embodiment according to the present invention.

FIG. 4 is an example of a fourth preferred embodiment 400 according to the present invention. FIG. 4 utilizes highly porous gas storage material 403, in powder or granular form (pellets), storing adsorbed gas 405 in the interior 402 of a cryogenic gas storage container 404 having a gas return circuit 406. The return circuit 406 contains a gas pump 414 (i.e., a hydrogen pump), a first heat exchanger 422, located within the cryogenic gas storage container 404, herein referred to as a "preheater", a second heat exchanger 430, and, optionally, a booster heater 432. Initially, the gas return circuit 406 contains heated free gas (i.e., non-adsorbed gas) 408' wherein the free gas is the same type of gas (i.e., both are the same gas as, for example, hydrogen) as the adsorbed gas 405 and the interior 402 of the cryogenic gas storage container 404 contains free gas 410 and adsorbed gas. The free gas 408' is heated by ambient heat or dissipation heat (i.e., heat dissipation from an internal combustion engine or fuel cell) utilizing a third heat exchanger 412. The pressure of the free gas 408' is increased by energizing gas pump 414 (i.e., a hydrogen pump). The heated, pressurized gas 418' flows through the preheater 422, thereby cooling the gas. The second heat exchanger 430 reheats the gas 418' by ambient heat or dissipation heat (i.e., heat dissipation from an internal combustion engine or fuel cell), and then enters the input 416 of the cryogenic gas storage container 404 as heated, pressurized gas 418' whereby free gas 410 in the interior 402 of the cryogenic gas storage container 404 is also heated. Gas 418' and heated free gas 410 desorb gas 420 from the adsorbed gas 405 stored in the highly porous gas storage material 403 by heat convection thereby cooling gas 418' and free gas 410. An auxiliary, for example an electric or catalytic, heater 432 may also be employed as a booster heater, if necessary, in the gas return circuit 406 for quick auxiliary heating of the gas 418' to provide faster desorption.

The now cooled free gas 410, gas 418', and desorbed gas 420 exit the cryogenic gas storage container 404 at its output 434 as output gas 424'. The output gas 424' is heated by ambient heat or dissipation heat (i.e., heat dissipation from an internal combustion engine or fuel cell) utilizing the third heat exchanger 412 and is, subsequently, resolved into a first heated gas 408 and a second heated gas 426. The first heated gas 408 is returned to the gas return circuit 406, whereas the second heated gas 426, in pipe 428, flows toward a consumer 436 The consumer 436 may be, for example, an automotive application utilizing fuel cells and/or an internal combustion engine.

The pressure of the first heated gas 408 is increased by energizing gas pump 414 (i.e., a hydrogen pump). The heated, pressurized gas 418 flows through the preheater 422, thereby cooling the gas. The second heat exchanger 430 reheats the gas 418 by ambient heat or dissipation heat (i.e., heat dissipation from an internal combustion engine or fuel cell), and then enters the input 416 of the cryogenic gas storage container 404 as heated, pressurized gas 418. Gas 418 desorbs gas 420 from the adsorbed gas 405 stored in the highly porous gas storage material 403 by heat convection, thereby cooling gas 418. The now cooled gas 418 and desorbed gas 420 exit the cryogenic gas storage container 404 at its output 434 as an output gas 424. The output gas 424 is heated by ambient heat or dissipation heat (i.e., heat dissipation from an internal combustion engine or fuel cell) utilizing the third heat exchanger 412 and is, subsequently, resolved into a first heated gas 408 and a second heated gas 426, whereby the above mentioned process repeats.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A system for desorption of gas, comprising:
a cryogenic gas storage container having an outlet and an inlet;
a highly porous gas storage material within said container, said material having an adsorbed gas;
a circulation path for gas between said outlet and said inlet, said path comprising:
a first path toward a gas consumer;
a second path connected with said first path, said second path comprising a recirculation path from said outlet to said inlet; and
a heat exchanger connected with at least one of said first and second paths;
a pump connected to said second path, said pump selectively pumping gas in said recirculation path toward said inlet; and
an auxiliary heater connected to said second path, said auxiliary heater being selected from the group consisting of electric heaters and catalytic heaters;
wherein heat supplied by said heat exchanger to gas within said recirculation path results in the gas within said recirculation path being warmed to a predetermined temperature above a cryogenic temperature of said material, wherein the warmed gas within said recirculation path passes into the inlet, circulates through said material, and thereby causes desorption of the adsorbed gas, whereupon the gas from the recirculation path and the desorbed gas exit at the outlet into said recirculation path; and
wherein the gas within the recirculation path and the desorbed gas are the same type of gas.

2. A system for desorption of gas, comprising:
a cryogenic gas storage container having an outlet and an inlet;
a highly porous gas storage material within said container, said material having an adsorbed gas;
a circulation path for gas between said outlet and said inlet, said path comprising:
a first path toward a gas consumer;
a second path connected with said first path, said second path comprising a recirculation path from said outlet to said inlet; and
a heat exchanger connected with at least one of said first and second paths;
a first gas valve connected to said first path;
a second gas valve connected to said second path;
a third gas valve connected to said second path, wherein said second and third gas valves are mutually separated to thereby provide a predetermined volume in said second path between said second and third gas valves; and
an auxiliary heater located between said second and third gas valves;
wherein said heat exchanger is connected with said second path between said second and third gas valves;
wherein heat supplied by said heat exchanger to gas within said recirculation path results in the gas within said recirculation path being warmed to a predetermined temperature above a cryogenic temperature of said material, wherein the warmed gas within said recirculation path passes into the inlet, circulates through said material, and thereby causes desorption of the adsorbed gas, whereupon the gas from the recirculation path and the desorbed gas exit at the outlet into said recirculation path; and
wherein the gas within the recirculation path and the desorbed gas are the same type of gas.

3. The system of claim 2, further comprising: a second heat exchanger connected to said first path.

4. A system for desorption of gas, comprising:
a cryogenic gas storage container having an outlet and an inlet;
a highly porous gas storage material within said container, said material having an adsorbed gas;
a circulation path for gas between said outlet and said inlet, said path comprising:
a first path toward a gas consumer;
a second path connected with said first path, said second path comprising a recirculation path from said outlet to said inlet; and
a heat exchanger connected with at least one of said first and second paths;
a pump connected to said second path, said pump selectively pumping gas in said recirculation path toward said inlet;
a first gas valve connected to said first path; and
a second gas valve connected to said second path;
wherein heat supplied by said heat exchanger to gas within said recirculation path results in the gas within said recirculation path being warmed to a predetermined temperature above a cryogenic temperature of said material, wherein the warmed gas within said recirculation path passes into the inlet, circulates through said material, and thereby causes desorption of the adsorbed gas, whereupon the gas from the recirculation path and the desorbed gas exit at the outlet into said recirculation path;
wherein the gas within the recirculation path and the desorbed gas are the same type of gas; and wherein said heat exchanger comprises a first heat exchanger located inside said container, said first heat exchanger comprising a portion of said second path interfacing with said material for imparting heat thereto.

5. The system of claim 4, further comprising:
a second heat exchanger connected with said second path, said second heat exchanger being located between said first heat exchanger and said inlet; and
a third heat exchanger connected with said first path.

6. The system of claim 5, further comprising:
an auxiliary heater located at said second path between said second exchanger and said inlet;
wherein said pump is located between said second heat exchanger and said auxiliary heater.

7. The system of claim 6, wherein said circulation path further comprises a third path toward the gas consumer connected to said second path between said second heat exchanger and said inlet.

8. A system for desorption of gas, comprising:
a cryogenic gas storage container having an outlet and an inlet;
a highly porous gas storage material within said container, said material having an adsorbed gas;
a circulation path for gas between said outlet and said inlet, said path comprising:
a first path toward a gas consumer;
a second path connected with said first path, said second path comprising a recirculation path from said outlet to said inlet; and
a first heat exchanger connected with said first and second paths;
a pump connected to said second path, said pump selectively pumping gas in said recirculation path toward said inlet;
a second heat exchanger connected with said second path, said second heat exchanger being located in said container, said second heat exchanger comprising a portion of said second path interfacing with said material for imparting heat thereto: and
a third heat exchanger connected with said second path, said third heat exchanger being located between said second heat exchanger and said inlet;
wherein heat supplied by said heat exchangers is passed to said material so as to thereby cause desorption of the adsorbed gas, whereupon the gas from the recirculation path and the desorbed gas exit at the outlet into said recirculation path;
and
wherein the gas within the recirculation path and the desorbed gas are the same type of gas.

9. The system of claim 8, further comprising:
an auxiliary heater located at said second path between said third exchanger and said inlet;
wherein said pump is located between said first and second heat exchangers.

10. A method for desorbing a gas from a highly porous storage material which adsorbs the gas within a cryogenic storage container, comprising the steps of:
heating a gas of the same type as the adsorbed gas;
circulating the heated gas through the material to thereby cause desorption of the adsorbed gas;
sending a selected portion of the gas exiting the container to a gas consumer;
recirculating the remaining portion of the gas back through the material;
pressurizing the heated gas by confining the gas during the heating;
releasing the pressurized heated gas so that the gas circulates through the material; and
cyclically repeating said steps of pressurizing and releasing.

11. A method for desorbing a gas from a highly porous storage material which adsorbs the gas within a cryogenic storage container, comprising the steps of:
heating a gas of the same type as the adsorbed gas;
circulating the heated gas through the material to thereby cause desorption of the adsorbed gas;
sending a selected portion of the gas exiting the container to a gas consumer;
recirculating the remaining portion of the gas back through the material; and
heating the material by heat exchange with the heated gas prior to said step of circulating the heated gas through the material.

12. The method of claim 11, wherein said selected portion is a firstly selected portion; said method further comprising, after said step of heating the material by heat exchange, sending a secondly selected portion of the gas exiting the container to the gas consumer.

13. The method of claim 12, further comprising selectively regulating flow of gas exiting the container with respect to said firstly selected and said secondly selected portions such that said firstly selected portion is selected between 100 percent and zero percent of the gas exiting the container.

14. The method of claim 13, wherein said step of heating is at least in part provided by heat exchanging dissipation heat of the gas consumer.

* * * * *